United States Patent [19]

Melear et al.

[11] Patent Number: 5,120,708

[45] Date of Patent: Jun. 9, 1992

[54] NON-POLUTING ANTI-STICK WATER-BASE DRILLING FLUID MODIFIER AND METHOD OF USE

[75] Inventors: Sidney Melear, Lafayette; John A. Guidroz, Jr., Port Barre; Gary Schlegel; William Micho, both of Lafayette, all of La.

[73] Assignee: Baker Hughes Incorporated, Houston, Tex.

[21] Appl. No.: 665,294

[22] Filed: Mar. 6, 1991

[51] Int. Cl.$^5$ .............................................. C09K 7/02
[52] U.S. Cl. ................................... 507/126; 252/49.3; 252/49.5; 252/52 A; 252/311.5; 106/277; 175/72; 166/301; 507/136
[58] Field of Search .............. 252/8.51, 8.511, 8.512, 252/8.514, 8.513, 49.3, 49.5, 52 A, 311.5; 166/301; 175/72; 106/277; 507/126, 136

[56] References Cited

U.S. PATENT DOCUMENTS

| | | | |
|---|---|---|---|
| 2,812,161 | 11/1957 | Mayhew | 252/8.512 |
| 3,223,622 | 12/1965 | Lummus et al. | 252/8.51 |
| 3,528,914 | 9/1970 | Darley | 252/8.5 |
| 3,682,187 | 8/1972 | Seymour et al. | 252/8.551 |
| 3,718,585 | 2/1973 | Lummus et al. | 252/8.51 |
| 3,723,311 | 3/1973 | Lummus et al. | 252/8.51 |
| 3,788,406 | 1/1974 | Messenger | 175/72 |
| 3,891,586 | 6/1975 | Califano et al. | 106/277 X |
| 3,901,316 | 8/1975 | Knapp | 166/294 |
| 3,957,524 | 5/1976 | Doughty et al. | 106/277 |
| 4,230,587 | 10/1980 | Walker | 166/301 X |
| 4,466,486 | 8/1984 | Walker | 166/301 |
| 4,614,235 | 9/1986 | Keener et al. | 166/301 |
| 4,743,383 | 5/1988 | Stewart et al. | 252/8.51 |
| 4,830,765 | 5/1989 | Perricone et al. | 252/8.51 |
| 4,902,349 | 2/1990 | Wakizaka et al. | 106/277 |
| 4,941,981 | 7/1990 | Perricone et al. | 252/8.51 |
| 4,957,560 | 9/1990 | Schilling | 106/277 |
| 4,963,273 | 10/1990 | Perricone et al. | 252/8.51 |
| 4,985,079 | 1/1991 | Graf et al. | 252/311.5 |
| 5,030,365 | 7/1991 | Christensen et al. | 252/8.515 |

Primary Examiner—John S. Maples
Assistant Examiner—C. Sayala
Attorney, Agent, or Firm—Tim L. Burgess

[57] ABSTRACT

A water-based drilling fluid additive composition comprising a water soluble polyoxyalkylene compound selected from polyoxyalkylene glycols, monoalkylethers of polyoxyalkylene glycols, and mixtures thereof, which have a cloud point in the range from about 60° F. to about 180° F., in combination with a water dispersible particulate asphalt having an ASTM D-36 softening point of at least 290° F., an ASTM D-5 penetration depth not exceeding about 10 mm, and a particulate size not exceeding more than about 10 percent retained on a 40 mesh U.S. screen.

20 Claims, No Drawings

NON-POLUTING ANTI-STICK WATER-BASE DRILLING FLUID MODIFIER AND METHOD OF USE

BACKGROUND OF THE INVENTION

This invention relates to drilling fluids used in the drilling, completion and workover of subterranean oil and gas wells, and more particularly, relates to a non-polluting additive for water-base drilling fluids to prevent drill pipe or casing sticking, when drilling or running casing, especially through depleted or subnormal pressure formation zones.

The most common form of drilling a subterranean oil or gas well is a rotary system in which a column of drill pipe is rotated to turn a multi-pronged drilling bit attached to the bottom of the pipe. The drill bit cuts into the earth formations, "making hole" and producing cuttings ("drilled solids") which must be removed as drilling continues. To do this, a drilling fluid is used. A liquid drilling fluid is a suspension in which fine particles of solid materials are mixed throughout the liquid, and is called drilling mud. In water-base muds, water is the liquid and is said to be the continuous phase; the particles are the dispersed phase. The dispersed phase of a water mud may include emulsified oil, and such muds are called oil emulsion muds. An oil-base mud has an oil continuous phase. Oxidized ("blown") asphalt particles may be mixed in oil base muds or oil emulsion muds to provide viscosity and/or wall building properties.

To remove cuttings, a drilling mud is circulated down the drill pipe, exits at the bit, and heads back up the bore hole in the annulus between the outside of the drill string and the wall of the bore hole. This circulation of the drilling mud removes cuttings made by the bit from the bottom of the hole and lifts them to the surface for disposal.

It is desirable for the drilling fluid to have a low viscosity when circulating down the drill pipe and out the bit, and to have a higher viscosity in the annulus. Low viscosity is important in removal of cuttings (chips). Unless cuttings are removed from beneath the bit before the next bit tooth arrives, the cuttings are reground. This decreases drilling penetration rates, which can increase costs of the well. Once in the annulus, the cuttings, which are generally heavier than the drilling mud, tend to settle downward. The upward velocity of the fluid in the annulus must be higher than the settling rate to bring the cuttings to the top of the hole. A higher viscosity in the annulus than at the bit reduces the settling rate.

A primary function of a drilling mud is to prevent formation fluids from flowing into the wellbore. This is usually done by adding a commercial weighting material, like barite, to the fluid to increase the density. When the hydrostatic pressure in the wellbore is higher than the pressure in a permeable formation, the mud tries to flow into the formation. A permeable formation operates as a strainer, holding back the solids in the mud while permitting the water to pass into pore spaces. As a result, a layer of solids called a filter cake is deposited on the exposed formation. Excessive water loss into a permeable formation has several undesirable effects, one of which is that the filter cake build up can cause tight places in the hole and drill string sticking.

No cake is formed on impermeable shale, but water from the drilling mud wets the surface and may make it cave in or slough before casing can be set. Blown petroleum asphalt treated to be water dispersible has been used in conventional water base muds where an asphaltic product is desirable for stabilization of troublesome shales. The asphalt particles are believed to plug microfractures and pore spaces in the shale, helping seal the shale from influx of water.

One of the most noticeable effects of filter cake build up in the mud is differentially stuck drill pipe. Differential sticking is a problem with any deviated hole, and is particularly likely to occur when drilling high angle holes from offshore platforms. It happens when a portion of the drill string lies against a side of a deviated hole where a filter cake has built up adjacent a permeable formation. While the pipe is being rotated, it is lubricated by a film of mud, and the hydrostatic pressure exerted by the drilling fluid is equal on all sides of the pipe. However, when rotation of the pipe is stopped, the portion of the pipe in contact with the filter cake is isolated from the mud column, and the differential of the hydrostatic pressure of the mud and the formation pressure exerted on opposing sides of the pipe presses the pipe into the filter cake and causes drag when an attempt is made to pull the pipe. This force (F) required to pull free is the product of the coefficient of friction (u) and the force pushing the drill string against the formation. The pushing force is the product of the area (A) of contact between the drill pipe and the cake, and the excessive hydrostatic pressure (P) at the contact area, which is equal to the difference between the pressure of the mud in the hole and the formation pressure. Thus, the force to pull free is:

$$F = uAP$$

The coefficient of friction u between the steel drill pipe and the mud cake depends on the composition of the mud. The area of wall contact A depends not only on the diameters of the pipe and the borehole, but also on filter cake thickness. The force to pull free may exceed the power of surface equipment, and unless the stuck pipe can be released, the hole, the drill string and equipment on the drill string below where the pipe is stuck may be lost. This can cause expensive remedial measures and usually side track (directional) drilling above the stuck pipe if that much of the hole is not to be abandoned.

The problem of differential sticking is exacerbated when drilling through formations of depleted or subnormal pressures. Generally the mud weight has been dictated by formation pressures above the zone of depleted pressure, and as a consequence, nothing can be done to offset the large pressure differentials that will exist between the pressure of the mud in the hole and the depleted formation pore pressure. Accordingly, the value P can become very large.

At high borehole angles, the drill pipe may so press against the formation while rotating as to prevent formation of a filter cake and mud lubricity is therefore critically important.

From the early days in the oil patch, oil has been used to loosen stuck drill pipe and to lubricate the borehole before running casing An oil slug weighted to the same density of the water base mud (a "pill") is placed in and circulated through the mud system in volume adequate to extend from the borehole bottom to a level at least as high as the uppermost point of differential sticking. The oil fluid invades the mud cake, reduces the adhesive forces and lubricates the pipe to reduce friction and facilitate a release of the pipe. Later developed oil emulsion and oil base muds have been favored for preventing differentially stuck drill pipe. Oil emulsion and oil base muds have much lower coefficients of friction than water based muds, and they also lay down very thin filter cakes, which reduces the contact area A.

However, environmental concerns enforced by world-wide governmental regulations increasingly have limited the use of oil emulsion or oil base formulations or oil spotting fluids in drilling operations where the mud might escape into environmentally sensitive areas, such as offshore waters. Recent environmental regulations for offshore drilling fluids require that: (1) no "sheen" be left upon the receiving waters by the drilling fluid; and (2) that the drilling fluid meet stringent toxicity limits as measured by bioassays of Mysidopsis bahia shrimp.

Beyond marine toxicity or other pollution concerns offshore, there is also difficulty and considerable expense in barging and holding large quantities of oil fluids for offshore use; further, all oil muds, and cuttings contaminated with oil muds, must be contained and transported back to shore for disposal. Moreover, land based drilling has the expense of disposing of cuttings and used oil base muds in an environmentally acceptable manner.

In consequence of environmental regulations having the practical effect of precluding use offshore of oil muds, new water base drilling muds have been developed in an effort to obtain performance associated with oil muds. Examples of some modified water base muds are described in U.S. Pat. Nos. 4,830,765, 4,941,981 and 4,963,273 assigned to the assignee of this invention. The muds in these patents include a water soluble component selected from glycol ethers, polypropylene glycols, tripropylene glycol bottoms, polyethylene glycols, ethylene oxidepropylene oxide copolymers, alcohol-initiated ethylene oxide-propylene oxide polymers and mixture thereof.

Water base muds have been described in the patent literature which contain polyoxyalkylene glycol additives to counter the problem of differential drill pipe sticking. U.S. Pat. No. 3,223,622 describes, for use in a spotting pill or as a component of an oil emulsion mud, surfactants which are ethylene oxide adducts of polypropylene glycol in which the molecular weight of the polypropylene glycol is 1500 to 2500 and 20 to 80 weight percent of the molecule is ethylene oxide groups. Stuck drill pipe release compositions involving polyoxyalkylene compounds for spotting pill application are described in U.S. Pat. No. 4,230,587 (polyethylene glycols having molecular weights from 106 to 600, used neat or dissolved in differing proportions in sea water according to molecular weight), and U.S. Pat. No. 4,614,235 (polyalkylene glycol ethers in a weighted water base spotting pill). U.S. Pat. No. 4,466,486 states that polyethylene oxide, ethylene oxide-propylene oxide copolymers, polyvinylmethylether and mixtures thereof in brine can be used in spotting pills to dehydrate and crack filter cake to release stuck pipe. Propoxylated tripropylene glycol bottoms have been used in aqueous spotting fluids.

In spite of developments in modified water base drilling fluids, there remains a need for a water base drilling fluid which provides prevention from sticking of tubular equipment in the borehole of the well due to differential pressure, especially when drilling or when running casing through depleted or subnormal pressure formations. Especially offshore, where high angle holes are drilled from platforms, such a water base drilling fluid is needed that is non-polluting, i.e., environmentally acceptable under currently prevailing regulation requirements mentioned above.

SUMMARY OF THE INVENTION

In accordance with this invention, there is provided a water-base drilling fluid additive composition, which comprises (a) a water soluble polyoxyalkylene compound selected from polyoxyalkylene glycols, monoalkylethers of polyoxyalkylene glycols, and mixtures thereof, which have a cloud point in the range from about 60° F. to about 180° F., in combination with (b) a water dispersible particulate asphalt having an ASTM D-36 softening point of at least 290° F., an ASTM D-5 penetration depth not exceeding about 10 mm, and a particulate size not exceeding more than about 10 percent retained on a 40 mesh U.S. screen.

From a methodical aspect of this invention, the additive composition is used in an aqueous drilling fluid by adding the additive to the drilling fluid and circulating the drilling fluid into, through and out of tubular equipment in the wellbore of the subterranean well for contact with the wall of the wellbore to improve operations involving movement of the tubular equipment in the wellbore, such as drilling, running casing, completion, or other typical functions.

Accordingly, as an aspect of the invention, there is provided a water-base drilling fluid, comprising the aqueous medium drilling fluid and from about 1 to about 20 volume percent of the additive composition of this invention.

The additive composition of this invention provides improved anti-stick qualities to filter cake deposits of water base drilling fluids to which it is added, and, like oil, is useful to lubricate the borehole before running casing, yet upon discharge of the drilling fluid into receiving surface waters, the additive is soluble in the water to give no prohibited "sheen" and exhibits significantly lower toxicity at surface conditions than drilling fluids containing oil.

Without being bound to this explanation, the remarkable anti-stick qualities imparted to water base mud filter cakes by this additive composition seem to involve surface conditioning of the oxidized asphalt particles by the polyoxyalkylene compounds and a synergistic lubricity achieved by cooperative coaction of the polyoxyalkylene and conditioned asphaltic components.

Additional objects, features, and advantages of this invention will be apparent in the following more detailed description.

DETAILED DESCRIPTION OF THE INVENTION

The additive composition of this invention comprises a water dispersible particulate asphalt and a water soluble polyoxyalkylene glycol, a water soluble monoalkylether of a polyoxyalkylene glycol, and mixtures thereof. The polyoxyalkylene compounds are characterized in having a cloud point in the range from about 60° F. to about 180° F., and preferably are compounds that correspond to the formula

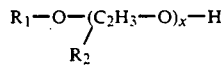

wherein $R_1$ is hydrogen or an alkyl group having from 1 to 10 carbon atoms, $R_2$ is hydrogen or an alkyl group having 1 to 2 carbon atoms, x is an integer from 3 to 55, and consecutive units of

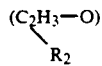

may be identical or nonidentical, random or block.

Polyoxyalkylene compounds of this invention are described in terms of a characteristic "cloud point" in the range of from about 60° F. to about 180° F. The "cloud point" for a candidate material is determined by preparing a fluid comprising a predetermined percent by volume of the water soluble polyoxyalkylene compound in a water medium, which may be fresh water or sea water, and heating the solution until the solution becomes cloudy. The cloud point is that temperature at which the material begins to come out of solution, becoming immiscible in the water and forming as a separate liquid phase. This characteristic of the polyoxyalkylene compounds in the additive composition of this invention permits the polyoxyalkylene compound to be soluble in water under most surface conditions in conformity with environmental regulations which do not permit an oil "sheen" to be left upon receiving waters by a discharged drilling fluid, yet behave like an oil at hotter temperatures in the borehole at and above the cloud point of the selected polyoxyalkylene compound. Suitably, a 1 percent concentration may be employed.

Another characteristic of the polyoxyalkylene compounds this invention is an $LC_{50}$ (lethal concentration at which 50 percent of organisms are killed) on mysid shrimp which is less than the toxicity of a 80:20 oil base drilling fluid containing a mineral seal oil as the oil phase, according to toxicity test procedures as set forth herein below.

Particularly preferred polyoxyalkylene compounds include polypropylene glycol having a molecular weight in the range of from about 250–600, and propoxylated tripropylene glycol bottoms having a molecular weight in the range from about 250 to about 1000. Preferably the tripropylene glycol bottoms which are propoxylated are those containing at least about 60 percent tetrapropylene glycol and heaviers, and more preferably, not more than about 30 percent of tripropylene glycol. The propoxylated tripropylene glycol bottoms are a mixture of tetramers and highers of propylene glycol which have the molecular weights in the 250–1000 range.

The polyoxyalkylene compounds of this invention include ethoxylated and propoxylated block and random copolymers of propylene glycol and monoalkyl ethers of propylene glycol, the alkyl group having from about 1 to about 10 carbon atoms. A preferred class of block copolymers has the formula

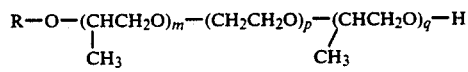

in which R represents an alkyl group of from about 4–12 carbon atoms and m is an integer of from about 0 to about 10, p is an integer of from about 5 to about 20, and q is an integer of from about 5 to 25. This class of material can be obtained from Olin Chemicals under the trade name "POLY-TERGENT", and has a molecular weight in the range of from about 500–3000. Random copolymers which may be used in accordance with this invention have a structural formula:

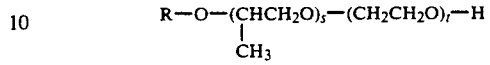

in which R represents an alkyl group of from about 1–10 carbon atoms, s is an integer in the range of from about 3–10, and t is an integer in the range of from about 0–10. This preferred class of materials can be obtained from BASF Wyandotte Corporation under the trade name "PLURACOL W" and has a total molecular weight in the range of from about 200–1200.

Suitable polyoxyalkylene glycol ethers may be more particulary described by the general formula:

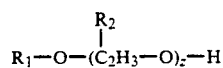

in which $R_1$ represents hydrogen or a lower alkyl group of from 1 to 8 carbons, and $R_2$ represents hydrogen, methyl and ethyl, and z represents an integer of 2 to 16, preferably 2 to 5. Included in this class are the methyl monoether of dipropylene glycol, ethyl monoether of dipropylene glycol, and propyl monoether of dipropylene glycol.

The following table sets forth these and other suitable polyoxyalkylene glycol compounds and their cloud point in a 30 percent or 50 percent concentration of the compound in deionized water.

| Polyoxyalkylene Compound | Concentration (Vol. %) | Cloud Point (°F.) |
|---|---|---|
| Polypropylene glycol 600 | 50 | 78 |
| Propoxylated tripropylene glycol bottoms | 50 | 78 |
| POLY-TERGENT S-405[a] | 30 | 86 |
| POLY-TERGENT S-305[a] | 30 | 88 |
| PLURACOL P-410[b] | 30 | 90 |
| ARNOX G-750[c] | 30 | 107 |
| POLY-TERGENT S-505[a] | 30 | 114 |
| ARNOX D-400[c] | 50 | 122 |
| UCON 50-HB-170[d] | 30 | 127 |
| UCON 50-HB-170[d] | 50 | 135 |
| PLURONIC 10R5[b] | 30 | 147 |
| PLURACOL W 660[b] | 30 | 150 |
| Polypropylene glycol 300 | 50 | 159 |
| NEODOL 25-7[e] | 30 | 160 |
| POLY GWT915[a] | 30 | 184 |

[a] Olin Chemicals
[b] BASF Wyandotte Corp.
[c] Baker Performance Chemicals
[d] Union Carbide Corporation
[e] Shell Chemical Co.

In general, it may be stated that the more ethylene oxide contained in the copolymer compounds in the above table, the more soluble is the compound and therefore the higher the cloud point in water. Also, in general, the lower the molecular weight or the lower the number of repeating propylene oxide units, the more soluble in water the compound is and therefore the higher the cloud point is.

The particulate asphalt compound of the composition of this invention is water dispersible, has an ASTM D-36 softening point of at least 290° F., has an ASTM D-5 penetration depth not exceeding 10 mm, and has a particulate size not exceeding more than 10 percent retained on a 40 mesh screen.

The ASTM test methods may be found in the annual book of ASTM Standards, Part 15, The American Society for Testing and Materials, Philadelphia, 1979: Test D-36 at pages 107-110, and Test D-5 at pages 88-92.

Suitably such an asphalt can be prepared by oxidizing asphaltic residuum from naphthenic crude at temperatures in the range from about 450°-500° F. for from about 6 to about 10 hours. The oxidized hardened asphalt is pulverized to a mesh size of not more than about 10 percent retained on a 40 mesh U.S. screen. Oxidized asphalt having a penetration depth in the range from about 6 mm to 10 mm is pulverized in a chilled hammer-mill to obtain the requisite particle size.

After reduction to the specified particle size, the asphalt may be made water dispersible by slurrying it with the polyoxyalkylene compound or it may be coated, suitably by spraying or stirring, with a water wetting surfactant. Suitable surfactants include zwitterions; anionic surfactants, such as carboxylic acid salts, sulfonic acid salts, sulfuric acid ester salts, phosphoric and polyphosphoric acid esters, and perfluorinated anionics; cationics, such as long-chain amines and their salts, diamines and polyamines and their salts, quaternary amonium salts, polyoxyethylenated long-chain amines, and amine oxides; and nonionics surfactants such as polyoxyethylenated alkyphenols and alkyl-phenol ethoxylates, polyoxyethylenated straight-chain alcohols and alcohol ethoxylates, polyoxyethylenated mercaptans, long-chain carboxylic acid esters, alkanolamine "condensates" and alkanolamides, and tertiary acetylenic glycols. A preferred surfactant is 2,4,7,9-tetramethyl-5-decyne-4,9-diol and its ethoxylates.

Suitably the water dispersible particulate asphalt is employed in amounts of from about 10 to about 80 weight percent, preferably from about 15 to about 50 weight percent, most preferably about 20 to 25 weight percent, in the additive composition of this invention.

In accordance with this invention, the additive composition suitably comprises from about 5 to about 95 volume percent of water, from about 95 to about 5 volume percent of the water soluble polyalkylene compound described above, and from about 10 to about 80 weight percent of the water dispersible particulate asphalt described above, and preferably, includes a viscosifier for suspension of solids in the water, whereby the water dispersible particulate asphalt is maintained in suspension in the solution of the polyoxyalkylene compound in water. Suitable viscosifiers for this purpose include the commercially available organophilic clays, bentonites, attapulgite clays, sepiolite, quar, carboxymethyl quar, hydroxypropyl quars, fumed silicas, fumed alumina, and the like. Preferred viscosifiers include attapulgite, sepiolite, organophilic clay and treated fumed silica.

Preferably, the additive composition comprises about 40-60 volume percent of water, about 60-40 volume percent of the polyoxyalkylene compound, about 1-5 weight percent of the viscosifier, and about 15-30 weight percent of the particulate asphalt. A particularly preferred composition is about 1-3 weight percent sepiolite and about 20-25 weight percent of the particulate asphalt in a 50/50 by volume solution of water and the polyoxyalkylene compound.

The additive composition of this invention may be used in the aqueous drilling fluid by simply mixing the additive and the drilling fluid as it is circulated to uniformly disperse and mix the additive with the drilling fluid. This mixing and circulating can be accomplished as the well fluid is used in the well for either drilling, running casing, completion, or any other typical function. The additive composition can also be mixed with the mud in storage tanks or pits using conventional means such as propeller mixers and pumps. The additive composition should be present in an amount up to about 5 percent for use during drilling, and for use as a spotting fluid to assist in running casing, for example, up to about 20 percent.

The aqueous medium well servicing fluid in which the additive composition of this invention is combined may further include from about 0.25 to about 45 pounds per fluid barrel of a viscosifier, from about 0 to about 700 pounds per fluid barrel of a weighting agent, from about 0 to about 20 pounds per fluid barrel of a deflocculent, and/or from about 0.25 to about 40 pounds per fluid barrel of a filtration control agent. A "barrel" means, in this document, a U.S. 42 gallon barrel.

The water phase of the additive composition and the aqueous medium of the well servicing fluid may comprise fresh or tap water, salt water, brines, simulated brines or mixtures thereof. In the case of waters containing mono and polyvalent salt ions, the drilling fluid system incorporating the present invention should not be salt sensitive.

The aqueous medium drilling fluid system of the present invention may contain known clayey viscosifier constituents forming a colloidal solids phase, such as attapulgite, sepiolite, bentonite or other compositions of clays and minerals. Typically, the drilling fluid composition of the present invention will incorporate none or up to about 45 pounds per barrel of such solids particulate matter. A suitable bentonite product is available under the trademark MIL-GEL, marketed by Milpark Drilling Fluids of Houston, Tex.

Any known deflocculant may be utilized in the aqueous medium drilling fluid composition of the present invention, such as lignosulfonates. Sodium/chrome lignosulfonates are preferably employed. Such a product is available under the trademark UNI-CAL, marketed by Milpark Drilling Fluids of Houston, Tex. Typically, such material may be present in the total drilling fluid composition in an amount of from between from about 0 pounds to about 20 pounds per barrel.

The drilling fluid may also contain well known weighting agents, such as barite or hematite, in any preferred amount up to a mud weight of about 756 pounds per barrel. A suitable barite product is available under the trademark MIL-BAR from Milpark Drilling Fluids, Houston, Tex.

Chemicals for use as filtration control additives which are well known to those skilled in the art, such as lignite, causticized lignite, carboxymethylcellulose or others, may be added also to the drilling fluid composition of the present invention, suitably in an amount from nil up to about 40 pounds per barrel, to lower filtration rate, although it has been found that the drilling fluid composition of the present invention itself will provide some benefit as a filtration rate control material.

In the examples which follow, a measure of the anti-stick characteristic of drilling muds containing the additive composition of this invention is given by sticking coefficients obtained with an OFI Differential Sticking Tester Apparatus, available from OFI Testing Equipment International, Houston, Tex. The sticking coefficient ("SC") determines the cake building capacity of the sample and the resistence to movement between that cake and a stainless steel surface. The test is run using a stainless steel pressure cell adapted to hold filter paper on a screen. The cell holds about 200 cc of fluid to be tested. A plate which just covers the filter paper is positioned above the screen and filter paper so that it can be moved down against the filter paper and rotated about a shaft to determine the torque in inch-pounds required to turn the plate when it adheres to the filter cake.

To test the cake building efficient and sticking tendency of a fluid, a fluid sample is sealed in the cell and about 475 psi gas pressure is applied to the fluid. After filtrate has run for 10 minutes, the plate is pushed down against the cake on the filter paper and held down for 15 minutes using a lever and weight which applies about 25 pounds of force to the shaft of the plunger or plate, until pressure equalizes sufficiently to allow the plate to stick. The filtrate volume is recorded, and the resistence to movement of the plate to the filter cake is measured in inch-pounds using a standard torque wrench on the plate shaft. The filtrate is then allowed to run for another 10 minutes, and again the plate is pushed down against the cake on the filter paper and held down for minutes under the same weight as before, after which the volume of filtrate and torque necessary to break the plate from the filter cake is again measured, after which the process is repeated twice more, so that readings are obtained at 15, 30, 45, and 60 minute intervals.

The rheological properties of drilling muds described in the examples which follow were measured using a direct reading rotational viscometer, namely the Fann Model 35 viscometer as described in API Method RP-13B. Viscosity of the fluid in centipoise is measured directly by immersing the viscometer sleeve and bob into the fluid. The sleeve is rotated at 3 and 600 rpm and the fluid drag on the bob produces a reading in centipoise. The 3 rpm reading setting is used to determine 10 second and 10 minute gel strengths. Plastic viscosity is calculated by subtracting the 300 rpm reading from the 600 rpm reading. Yield point is the 300 rpm reading minus the plastic viscosity reading. Apparent viscosity equals the 600 rpm reading divided by 2. Fluid loss or API filtrate at 100 psi in milliliters (ml) per 30 minutes and high temperature, high pressure fluid loss (HTHP) in ml at 200° F. and 1000 psig are measured with the apparatus and procedure described in the API Method 13B. Other tests such as pH, methylene blue titrations (MBT) are standard and well known in the art.

EXAMPLE I

Three alternative well servicing fluid samples were tested for rheology and sticking coefficients. Each sample was made from an identical base mud constituted as follows ("ppb"=pounds per barrel; "bbl"=barrel):

| MIL-GEL | (bentonite) | 20 ppb |
|---|---|---|
| MIL-BAR | (barite) | 178.5 ppb |
| UNI-CAL | (chromic lignosulfate) | 5.0 ppb |
| LIGCON | (causticized lignite) | 10.0 ppb |
| LIGNO | (lignite) | 3.0 ppb |
| MILPARK CMC, Reg | (carboxymethylcellulose) | 0.5 ppb |
| Soda Ash | | 1.0 ppb |

-continued

| Caustic Soda | 1.0 ppb |
|---|---|
| Sea Water | .414 bbl |
| Tap Water | .414 bbl |

For Sample A, 2.7 volume percent of a product marketed by Sun Chemical Co. under the trademark BLACK KNIGHT (and said by labeling accompanying the product to be a gilsonite in an aqueous medium of glycol) was added to the base mud.

For Sample B, 2.7 volume percent of a well servicing fluid component of this invention (hereinafter sometimes called "Composition B") was added to the base mud. The component was 49.2 weight percent fresh water, 48.5 weight propoxylated tripropylene glycol bottoms having a cloud point in the range of about 150°-160° F., and 2.4 weight percent sepiolite, to which was added 100 pounds per barrel of a particulate asphalt described above, for a final percents by weight make up of 38.6 percent water, 38 percent propoxylated tripropylene glycol bottoms, 1.9 percent sepiolite and 21.5 percent particulate asphalt.

For Sample C, 2.7 volume percent of WBL 1600 marketed by CESCO Chemicals, Lafayette, La., was added to the base mud.

Samples A, B, and C were then hot rolled at 150° F. for 12 hours.

Rheological properties were then determined, and are set forth below in Table 1.A.

TABLE 1.A.

| | Rheology Tests | | |
|---|---|---|---|
| Sample | A | B | C |
| Flow Properties Test Temp (°F.) | 120° | 120° | 120° |
| 600 rpm Fann reading | 250 | 38 | 66 |
| 300 rpm Fann Reading | 230 | 22 | 49 |
| Plastic Viscosity, cp | 20 | 16 | 17 |
| Yield Point, lb/100 sq. ft. | 210 | 6 | 32 |
| Initial Gel, lb/100 sq. ft. | 105 | 2 | 21 |
| 10 Min. Gel., lb/100 sq. ft. | 125 | 7 | 22 |

As seen from Table 1.A., Sample B made in accordance with this invention was a much more flowable mud with highly reduced viscosity properties than either Sample A or Sample C.

Samples A, B, and C were also tested for their sticking coefficients, and the results are set forth in Table 1.B.

TABLE 1.B.

| | Stickometer Tests | | | | | |
|---|---|---|---|---|---|---|
| Sample | A | | B | | C | |
| Time (Min.) | ml's | S.C. | ml's | S.C. | ml's | S.C. |
| 15 | 4.0 | .0096 | 2.3 | 0 | 5.6 | .0239 |
| 30 | 4.7 | .0143 | 2.7 | 0 | 6.2 | .0669 |
| 45 | 5.1 | .0287 | 3.2 | 0 | 6.6 | .0764 |
| 60 | 5.4 | .0382 | 3.5 | 0 | 7.0 | .0860 |

As seen from Table 1.B., the stickometer test results show that nil stickometer coefficients were obtained with Sample B, indicating an exceptionally low coefficient of friction for Sample B both absolutely and in comparison to Samples A and C.

EXAMPLE II

A seawater lignosulfonate mud modified with 1½ volume percent of Composition B was tested for use in preventing differential sticking when drilling through depleted pressure zones.

An operator drilled an "S" shaped hole (maximum angle 37°) from a platform offshore of South Louisiana, in the Ship Shoal area. Casing was 10¾ inches at 3,610 feet and 7 inches production string at 9,750 feet. There were seven depleted sands between 7,750 feet and 9,750 feet. The operator added 1½% of Composition B to a sea water lignosulfonate mud and maintained this concentration to a total depth of 9,750 feet (9,302 feet TVD).

No adverse effects on mud properties were detected after the addition of Composition B. The well was drilled to total depth, logged, and cased with no indications of sticking or torque and drag problems. Pertinent mud and well information follow:

TABLE I.C.

| | |
|---|---|
| Total Depth: | 9,750' (9,302' TVD) |
| Mud Type: | Seawater lignosulfonate with 1½% cmpd B. |
| Weight (ppg): | 10.4+ |
| Viscosity: | 40 |
| Plastic Viscosity: | 10 |
| Yield Point: | 6 |
| Gels (10 sec/10 min): | 2-8 |
| Filtrate API: | 6.0 |
| HT-HP (200° F.): | 15.0 |
| pH: | 9.6 |
| MBT (ppb equiv.): | 30 |
| Solids: | 11% |
| Chloride (mg/L): | 19,000 |
| Maximum Angle: | 37° |

EXAMPLE III

A base lignosulfonate mud (Sample D) and the same mud modified by the addition of 3 volume percent of Composition B (Sample E) were aged by hot rolling at 150° F. for 12 hours and then tested for rheological properties, sticking coefficients and filtration properties, with the results set forth in Tables 3.A., 3.B., and 3.C.

TABLE 3.A.

| Sample | Rheology Tests | |
|---|---|---|
| | D | E |
| Mud Weight, lb/gal | 11.5 | — |
| Flow Properties Test Temp. (°F.) | 120 | 120 |
| 600 rpm Fann Reading | 76 | 37 |
| 300 rpm Fann Reading | 45 | 21 |
| 200 rpm Fann Reading | 33 | 15 |
| 100 rpm Fann Reading | 18 | 9 |
| 6 rpm Fann Reading | 3 | 2 |
| 3 rpm Fann Reading | 2 | 1 |
| Apparent Viscosity, cp | 38 | 18 |
| Plastic Viscosity, cp | 31 | 16 |
| Yield Point, lb/100 sq. ft. | 14 | 6 |
| Initial Gel, lb/100 sq. ft. | 3 | 2 |
| 10 Min. Gel, lb/100 sq. ft. | 24 | 22 |

As seen from Table 3.A., the modified lignosulfonate mud was about twice as flowable and had about 50 percent lower viscosity compared to the base mud.

TABLE 3.B.

| Sample | Stickometer Tests | | | |
|---|---|---|---|---|
| | D | | E | |
| Time (Mins.) | ml's | S.C. | ml's | S.C. |
| 15 | 4.0 | .0382 | 4.3 | 0 |
| 30 | 4.8 | .0429 | 5.3 | .0382 |
| 45 | 5.3 | .0526 | 6.0 | .0526 |
| 60 | 5.8 | .0573 | 6.5 | .0573 |

TABLE 3.C.

Filtration Testing
H.T.H.P. Testing @ 1000 psig @ 200°
Dynamic Testing 200 sec⁻¹

| Sample Time (Mins.) | D | E |
|---|---|---|
| 1 | 4.0 | 2.0 |
| 2 | 6.0 | 3.6 |
| 3 | 7.6 | 4.8 |
| 4 | 8.8 | 6.4 |
| 5 | 10.4 | 7.6 |
| 6 | 11.6 | 8.8 |
| 7 | 12.8 | 9.6 |
| 8 | 13.6 | 10.4 |
| 9 | 14.8 | 11.2 |
| 10 | 15.6 | 12.0 |
| 15 | 19.2 | 15.2 |
| 20 | 22.0 | 17.6 |
| 25 | 24.8 | 20.0 |
| 30 | 26.8 | 22.0 |
| 40 | 30.4 | 25.6 |
| 50 | 33.6 | 29.2 |
| 60 | 36.4 | 32.0 |
| 70 | 38.8 | 34.8 |
| 80 | 40.8 | 37.6 |
| 90 | 42.8 | 40.0 |
| 100 | 45.2 | 42.0 |
| 110 | 47.6 | 44.2 |
| 120 | 49.6 | 46.0 |
| Cake Thickness (mm) | 9.0 | 4.5 |
| HTHP (cc/30 min.) | 26.8 | 22.0 |

As seen from Table 3.C., the modified lignosulfonate mud showed a decrease of 50 percent in cake thickness, a 7.26 percent filtrate decrease under dynamic conditions (shear rate=200 sec.⁻¹), with a high temperature, high pressure (200° F., 1000 psig) filtrate decrease of 17.91 percent.

EXAMPLE IV

A mud modified with from 2 to 2½ volume percent of Composition B was employed offshore of South Louisiana in Eugene Island 330 to overcome a differential sticking problem encountered by an operator.

While drilling a directional hole from a platform in Eugene Island 330, the operator experienced stuck pipe in a 34° angle hole at approximately 7,500 feet. There were 11 depleted sands in this well. It is believed that pipe stuck in a sand at about 6,300 feet TVD, which was drawn down to approximately 1,000 psig. At the time pipe was stuck, the mud weight was 12.2 pounds per gallon and the API filtrate was 4.4 cc's.

Attempts to free pipe were unsuccessful and the well was sidetracked at about 6,400 feet. (A mud motor, steering tool, 243 feet of 8 inch collars and ±17 joints of 5 inch heavy weight were left in hole.) To reduce the risk of wall sticking in the sidetrack hole, it was decided that 2 to 2½ volume percent of Composition B would be added and maintained while drilling this 12¼ inch hole interval. This section of hole was drilled to 8,872 feet with 14.6 pounds per gallon mud weight and 3.4 API filtrate. No indicators of sticking were observed while drilling and logging this interval, and 9⅝ inch casing was run with no difficulties. No adverse effects on rheology were noted and no foaming tendencies were observed.

EXAMPLE V

A sea water/partially hydrolyzed polyacrylamide ("PHPA") polymer drilling mud was modified with 3 percent by volume of Composition B for sidetrack directional drilling after the operator encountered stuck pipe with the unmodified mud. The operator's original plans had been to drill an 8½ inch hole from 11¾ inch casing set at 8,031 feet to a proposed total depth of 9,609 feet with a PHPA mud system from a platform offshore of South Louisiana, in the South Marsh Island Block 136. Two severely depleted sands (8.6-8.7 pounds per gallon) were to be drilled at about 9,300 feet with a 16.8 pounds per gallon mud weight. The operator drilled an 8½ inch hole to 9,609 feet with a Seawater/PHPA mud system with no problems. Some fluid seepage to depleted sands was noticed. The problem was corrected with sweeps of calcium carbonate, mica, and fibrous materials. The operator short tripped to total depth with no problems, pulled out of the hole, and picked up a log while the drilling tool remained on the end of the drill pipe. The operator stuck pipe while making a connection at 9,334 feet. Table 5.A. sets forth the properties of the mud when the pipe stuck:

TABLE 5.A.

| Mud Properties When Stuck | |
|---|---|
| Weight (PPG) | 16.8 |
| Funnel Viscosity @ 135 degrees | 55 |
| Plastic Viscosity | 39 |
| Yield Point | 19 |
| Gel Strengths (10 sec/10 min) | 5/15 |
| Filtrate API | 2.0 |
| HTHP Filtrate at 300 degrees | 8.4 |
| Cake Thickness | 2/3 |
| HTHP Cake Compressibility 500 psi/100 psi at 300 degrees | 1.4 |
| Solids % | 34 |
| Low Gravity Solids % | 4.2 |
| MBT (lb/bbl equivalent) | 25.0 |
| pH | 10.0 |
| Pm | 1.9 |
| Pf/Mf | .5/1.4 |
| Chlorides (mg/L) | 10,000 |
| Total Hardness (mg/L) | 160 |

The operator set a cement plug to sidetrack at 8,735 feet. Sidetrack drilling operations were kicked off at 8,735 feet with an 8½ inch bit. At about 9,285 feet the operator added 3 percent by volume of Composition B to the same mud as used before, and drilled to 9,646 feet with no problems. The operator spotted a 75 barrel pill in the open hole containing 10 percent by volume Composition B and pulled out of hole. The operator then ran a 7 inch liner to bottom with no problems and cemented same.

EXAMPLE VI

A dynamic filtration study was run on the base mud with which pipe sticking happened in Example V (Sample F) and also on a fluid made up of the same base mud plus 3 volume percent Composition B (Sample G). The samples were tested under dynamic conditions (100 sec.$^{-1}$) for one hour, then at static conditions for three hours, at 185° F. and at a differential pressure of 1000 psig, with the following results: 3).

TABLE 6

Filtration Testing
H.T.H.P. Testing at 185° F.
Dynamic Testing at 100 sec$^{-1}$

| Sample Time/Minutes | F | | G | |
|---|---|---|---|---|
| | Dynamic | Static | Dynamic | Static |
| 1 | .5 | | 1.6 | |
| 2 | 1.0 | | 2.0 | |
| 3 | 1.4 | | 2.2 | |
| 4 | 2.0 | | 2.8 | |
| 5 | 2.4 | | 3.2 | |
| 6 | 2.8 | | 3.6 | |

TABLE 6-continued

Filtration Testing
H.T.H.P. Testing at 185° F.
Dynamic Testing at 100 sec$^{-1}$

| Sample Time/Minutes | F | | G | |
|---|---|---|---|---|
| | Dynamic | Static | Dynamic | Static |
| 7 | 3.2 | | 4.0 | |
| 8 | 3.6 | | 4.4 | |
| 9 | 3.8 | | 4.6 | |
| 10 | 4.4 | | 4.8 | |
| 15 | 5.6 | | 6.4 | |
| 20 | 7.2 | | 7.6 | |
| 25 | 8.0 | | 8.4 | |
| 30 | 9.2 | | 9.6 | |
| 40 | 12.8 | | 11.2 | |
| 50 | 14.4 | | 12.8 | |
| 60 | 15.6 | | 14.0 | |
| 120 | | 24.4 | | 20.0 |
| 180 | | 30.0 | | 25.2 |
| 240 | | 35.6 | | 28.8 |
| Cake Thickness (mm) | | 10.0 | | 7.0 |
| HTHP (cc/30 min.) | | 9.2 | | 9.6 |

The sample G (containing 3 percent Composition B) showed a decrease of 30 percent in cake thickness (10.0 mm to 7.0 mm), and a decrease of 19% in filtrate corrected (35.6 cc to 28.8 cc). It was observed that the sample containing Composition B had a tougher, better-textured filter cake than the base sample.

EXAMPLE VII

A string of 7⅝ inch casing was set at 15,191 feet from a platform offshore, Louisiana, in West Delta, Block 20. While drilling a 6½ inch hole at 16,380 feet with a mud weight of 9.5 ppg., an API fluid loss of 4.4 cc's and a HT-HP of 17.4 cc's, pipe was stuck and jarred free. Two attempts to log the hole on the drill pipe failed. The log could not get past 16,323 feet. After reaming to bottom, the hole was drilled to 16,455 feet. An attempt to log failed. This time the log could not get past 15,360 feet. The hole was drilled to 16,600 feet, having to ream up and down on connections. The pipe was stuck on bottom and was jarred free. Orders were received to run a 5½ inch liner. The mud weight was increased to 10.5 ppg. and the HT-HP was lowered to 13.0 cc's. Fifteen percent Composition B was spotted in the open hole prior to running casing. The liner went to bottom but was pulled back out to change out the float equipment. The liner was run the hole a second time and was set on bottom.

Stickometer tests were conducted on the base mud used in the operation described in the preceding paragraph (a low lime mud) (Sample H) and on the same mud with 2½ volume percent of added Composition B (Sample I), with the following results:

TABLE VII

| Sample Time (Min.) | Stickometer Tests | | | | Percent Reduction |
|---|---|---|---|---|---|
| | H | | I | | |
| | ML's | S.C. | ML's | S.C. | |
| 15 | 2.4 | .0096 | 1.9 | 0 | 100% |
| 30 | 3.0 | .0143 | 2.4 | .0048 | 66% |
| 45 | 3.3 | .0143 | 2.9 | .0096 | 32% |
| 60 | 3.7 | .0143 | 3.2 | .0143 | 0% |

EXAMPLE VIII

A direction well was drilled from a platform in offshore Louisiana, Ship Shoal Block 225, with the kick-off point at 1,492 feet and an average 41° angle built by 3,775 feet. A 13½ inch bit was used in this interval with a low solids, non-deflocculated salt water mud drilling in 35 rotary hours. A 9⅞ inch Reed Rock Bit was used in the 3,775 foot to 7,147 foot interval with a low pH, LIGCON, MIL-PAC, KOH, salt water drilling fluid. A 9⅞ inch Hughes PDC (polycrystalline diamond) bit was used to drill the 7,147 foot to 12,875 foot interval with a low pH drilling fluid as employed for the 3,775-8,000 feet interval modified by addition of Composition B. Maximum mud weight was 10.1 ppg and the well was drilled to total depth in 13 days, which was 14 days under curve. The reduction in days was probably due to a smooth trajectory, good fluid properties, and excellent bit runs. The excellent run with the PDC bit suggests that the mud modified with Composition B possesses excellent lubricity in regards to PDC bit performance in water base mud.

EXAMPLE IX

A laboratory prepared sample of a well servicing fluid (mud) containing 3.0 volume percent of Composition B was bioassayed to determine its toxicity. The tested mud had the following composition:

TABLE 9.A.

| Components of a Mud Containing 3.0% (by vol.) Composition B Sample hot-rolled 16 hours at 150° F. | |
|---|---|
|  | lb/bbl |
| MILGEL (bentonite) | 20.0 ppb |
| MIL-BAR (barite) | 178.5 ppb |
| UNI-CAL (chrome lignosulfonate) | 5.0 ppb |
| LIGCO (lignite) | 3.0 ppb |
| Seawater | 0.414 bbl |
| Tap Water | 0.414 bbl |
| Soda Ash | 1.0 ppb |
| MILPARK CMC, Reg. (carboxymethylcellulose) | 0.5 ppb |
| Caustic Soda | 1.0 ppb |
| Composition B (% by vol) | 3.0 ppb |

The test was conducted using the 1:9 suspended particulate phase of the mud. Mysid shrimp (*Mysidopsis bahia*), 3-6 days of age, were used as test organisms. Statistical analysis on the results after 96 hours to determine the $LC_{50}$ (lethal concentration at which 50 percent of the organisms are killed) was conducted using the Moving Average Method.

The materials and methods used to conduct the bioassay were based on protocols established by American Petroleum Institute, Production Department, 1984, "API Recommended Practice, Standard Procedure for Drilling Fluid Bioassays (Tentative)," API RP13H, 22 pp., and U.S. Environmental Protection Agency, 1985, "Oil and Gas Extraction Point Source Category, Offshore Subcategory; Effluent Limitations Guidelines and New Source Performance Standards; Proposed Rule," Federal Register, 40 CFR Part 435, 6 pp. All equipment was detergent washed, acid rinsed, and rinsed with distilled water. The following sections describe the materials and methods in detail.

Artificial seawater was prepared by mixing commercial synthetic sea salts with deionized water. A final salinity of 20±2 parts per thousand (0/100) was obtained. The seawater water was constantly aerated while it was allowed to age 2-3 weeks before being used in the test. The seawater was stored at 20±2° C.

Mysid shrimp (*Mysidopsis bahia*) were acclimated to a salinity of 20±2 parts per thousand and 20±2° C. over several days before being introduced to the test media. Throughout acclimation and testing, mysids were fed 48 hour old brine shrimp (*Artemia*). Testing with the standard toxicant (sodium lauryl sulfate) indicated a 96-hour $LC_{50}$ of approximately 12 parts per million (ppm).

A one gallon sample of the mud of the composition shown in Table 7.A. was vigorously mixed. A 1:9 v/v mixture of mud and seawater was prepared by adding 1000 ml mud to 9,000 ml seawater in a plastic container. This mixture was mixed with a magnetic stirrer for 5 minutes and the pH was adjusted with 6 N HCl and 6 N NaOH to within ±0.2 units of seawater. The slurry suspension was then allowed to settle for one hour and the supernatant was decanted. This was the suspended particulate phase (SPP). A prior range finding test indicated that test solutions of 10.0 percent, 18.0 percent, 32.0 percent, 56.0 percent, and 100.0 percent of the SPP should be used. These concentrations were prepared using one liter dishes, diluting the 100 percent SPP with artificial seawater. A set of controls using 100 percent artificial seawater was prepared in addition to the other five concentrations.

The mysids were counted at 0 and 96 hours in the mud test. The test suspensions had dark coloring which disallowed intermediate counts.

Temperature, salinity, dissolved oxygen, and pH were measured every 24 hours. The temperature was adjusted to 20±2° C. Salinities were 20±2 parts per thousand. Aeration was supplied to all test containers and dissolved oxygen content was maintained above 44 ppm. The pH ranged from 7.9 to 8.2 after the initial adjustment of the 100 percent SPP, prior to dilution, with 10 percent HCl.

Survival in all of the bioassays was compared to control survival using the Student's t-test. When survival in any of the bioassays was less than 50 percent, a 96 hour $LC_{50}$ was calculated using the method of C.E. Stephan, 1982. "Computer Program for the Calculation of $LC_{50}$ Values," U.S. Environmental Protection Agency, Duluth, Minn.

The results of the bioassay are given in Table 7.B. Control survival was 98.3 percent.

TABLE 9.B.

| 96 Hour Survival of *Mysidopsis bahia* Exposed to the Suspended Particulate Phase of Table 9.A. Mud Containing 3.0% (by vol.) Composition B | |
|---|---|
| Concentration (% Phase) | Percent Survival |
| 100.0 | 83.3 |
| 56.0 | 90.0 |
| 32.0 | 85.0 |
| 18.0 | 95.0 |
| 10.0 | 96.7 |
| Control | 98.3 |

Survival in all dishes was greater than 50 percent. The $LC_{50}$ was determined by the Moving Average Method to be greater than 100.0 percent phase (greater than 1,000,000 ppm SPP) with the 95 percent confidence interval of 0 and infinity. In comparison, the mysid shrimp $LD_{50}$ of an 80:20 oil base drilling fluid containing a mineral seal oil (Mentor -28, Exxon Company) as the oil phase has been found to be 50,000 ppm (5%) in the suspended particulate phase.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. A water-base drilling fluid additive composition, which comprises
   (a) a water soluble polyoxyalkylene compound selected from polyoxyalkylene glycols, monoalkylethers of polyoxyalkylene glycols, and mixtures thereof, which have a cloud point in the range from about 60° F. to about 180° F., in combination with
   (b) a water dispersible particulate asphalt having an ASTM D-36 softening point of at least 290° F., an ASTM D-5 penetration depth not exceeding about 10 mm, and a particulate size not exceeding more than about 10 percent retained on a 40 mesh U.S. screen.

2. The additive composition of claim 1 in which said particulate asphalt is wetted by said polyoxyalkylene compound.

3. A water-based drilling fluid additive composition, comprising
   (a) from about 5 to about 95 volume percent of water,
   (b) from about 95 to about 5 volume percent of a water soluble polyoxyalkylene compound selected from polyoxyalkylene glycols, monoalkylethers of polyoxyalkylene glycols, and mixtures thereof, which have a cloud point in the range from about 60° F. to about 180° F., and
   (c) from about 10 to about 80 weight percent of a water dispersible particulate asphalt having an ASTM D-36 softening point of at least 290° F., an ASTM D-5 penetration depth not exceeding about 10 mm, and a particulate size of not more than about 10 percent retained on a 40 mesh screen.

4. The additive composition of claim 3 further comprising a viscosifier for suspension of said particulate asphalt in said water.

5. The additive composition of claim 3 in which said polyoxyalkylene compound corresponds to the formula

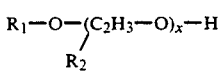

wherein $R_1$ is hydrogen or an alkyl group having from 1 to 10 carbon atoms, $R_2$ is hydrogen or an alkyl group having 1 to 2 carbon atoms, x is an integer from 3 to 55, and consecutive units of

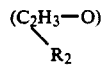

may be identical or nonidentical, random or block.

6. The additive composition of claim 5 in which said polyoxyalkylene compound is an ethylene oxide-propylene oxide random copolymer having a molecular weight in the range of about 200–1200.

7. The additive composition of claim 5 in which the polyoxyalkylene compound is an ethylene oxide-propylene oxide block copolymer having a molecular weight in the range of about 500–3,000.

8. The additive composition of claim 5 in which said polyoxyalkylene compound is polypropylene glycol having a molecular weight in the range of about 250–600.

9. The additive of composition of claim 5 in which said polyoxyalkylene compound is a mixture of tetramers and highers of propylene glycol having molecular weights in the range of from about 250 to about 1000.

10. The additive composition of claim 1 in which said particulate asphalt is coated with a water wetting surfactant.

11. The additive composition of claim 4 in which said viscosifier is selected from sepiolite, attapulgite, organophilic clay and treated fumed silica.

12. The additive composition of claim 11 in which said polyoxyalkylene compound has a molecular weight in the range of about 250–1000, and comprising about 40–60 volume percent of water, about 60–40 volume percent of said polyoxyalkylene compound, about 1–5 weight percent of said viscosifier, and about 15–30 weight percent of said particulate asphalt.

13. The additive composition of claim 12 in which said viscosifier is sepiolite and said polyoxyalkylene compound is a mixture of tetrapropylene glycol and heaviers having a cloud point of from about 150°–160° F. made by propoxylating tripropylene bottoms having a content of at least about 60 percent tetrapropylene glycol and heaviers.

14. The additive composition of claim 13 comprising about 50 volume percent of water, about 50 volume percent of said propoxylated tripropylene glycol bottoms, about 1–3 weight percent of said sepiolite, and about 20–25 weight percent of said particulate asphalt.

15. A water-base drilling fluid, comprising
    (a) an aqueous medium,
    (b) from about 1 to about 20 volume percent of the drilling fluid additive composition of any one of claims 1–14.

16. A method of preventing sticking of tubular equipment in the wellbore of a subterranean well in the drilling, completion, or workover of such well, comprising the steps of:
    (a) preparing a water-based drilling fluid;
    (b) adding to the water-based drilling fluid the additive of any one of claims 1–14; and
    (c) circulating the drilling fluid into, through, and out of the tubular equipment into the subterrean well, whereby the drilling fluid contacts the bore hole wall of the well.

17. The method of claim 16 further comprising the step of conducting operations involving movement of tubular equipment in the bore hole of said well.

18. The additive composition of claim 1 in which said polyoxyalkylene compound has a molecular weight in the range from about 250–1000, and comprising about 40–60 volume percent of water, about 60–60 volume percent of said polyoxyalkylene compound, and about 15–30 weight percent of said particulate asphalt.

19. The additive of composition of claim 18 in which said polyoxyalkylene compound is propoxylated tripropylene glycol bottoms having a cloud point of from about 150°–160° F.

20. The additive composition of claim 5 in which said polyoxyalkylene compound comprises about 40–60 volume percent of water, about 60–40 volume percent of said polyoxyalkylene compound, and about 15–30 weight percent of said particulate asphalt.

* * * * *